US009635528B2

(12) United States Patent
Liu et al.

(10) Patent No.: US 9,635,528 B2
(45) Date of Patent: Apr. 25, 2017

(54) SERVER, DATA CACHING METHOD, AND COMMUNICATION SYSTEM

(71) Applicant: HITACHI, LTD., Tokyo (JP)

(72) Inventors: Chunguang Liu, Beijing (CN); Peng Yang, Beijing (CN); Xiaolei Wang, Beijing (CN); Yanan Bao, Beijing (CN); Sheng Zhou, Beijing (CN); Mika Mizutani, Beijing (CN); Zhisheng Niu, Beijing (CN)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 14/204,174

(22) Filed: Mar. 11, 2014

(65) Prior Publication Data

US 2014/0297792 A1     Oct. 2, 2014

(30) Foreign Application Priority Data

Mar. 28, 2013    (CN) .......................... 2013 1 0101545

(51) Int. Cl.
    *G06F 15/16*       (2006.01)
    *H04W 4/18*        (2009.01)
                    (Continued)

(52) U.S. Cl.
    CPC ............. *H04W 4/18* (2013.01); *H04L 1/0057* (2013.01); *H04L 1/0061* (2013.01);
                    (Continued)

(58) Field of Classification Search
    CPC ......... H04L 29/08549; H04L 29/08801; H04L 67/2842; H04L 67/10; H04L 67/1097;
                    (Continued)

(56) References Cited

U.S. PATENT DOCUMENTS 8,296,812 B1 * 10/2012 Ganesan ............ H04N 21/2181
                                          725/101
2003/0009577 A1 * 1/2003 Apostolopoulos .... H04W 36/12
                                          709/231

(Continued)

FOREIGN PATENT DOCUMENTS

EP           2 202 888 A1    5/2005
WO       2006/121900 A2   11/2006

*Primary Examiner* — Liangche A Wang
*Assistant Examiner* — Johnny Aguiar
(74) *Attorney, Agent, or Firm* — Mattingly & Malur, PC

(57) ABSTRACT

It is provided are a server including: a storage module for storing original files and characteristics of the original files; an encoding module for encoding the original files stored in the storage module to generate encoded symbols; an information acquisition module for communicating with at least one transmission node and acquiring state information from the at least one transmission node; a control module for calculating a number of the encoded symbols to be sent to the at least one transmission node for caching based on the characteristics of the original files stored in the storage module and the state information of the at least one transmission node acquired by the information acquisition module; and a communication module for sending the encoded symbols to the at least one transmission node based on the number of the encoded symbols calculated by the control module.

7 Claims, 9 Drawing Sheets

(51) Int. Cl.
   *H04L 12/26* (2006.01)
   *H04L 1/00* (2006.01)
   *H04L 29/08* (2006.01)

(52) U.S. Cl.
   CPC ...... *H04L 1/0064* (2013.01); *H04L 29/08801* (2013.01); *H04L 43/08* (2013.01); *H04L 43/0876* (2013.01); *H04L 43/0882* (2013.01); *H04L 67/2842* (2013.01)

(58) Field of Classification Search
   CPC ... H04L 1/0057; H04L 1/0061; H04L 1/0064; H04L 43/08; H04L 43/0876; H04L 43/0882; G06F 3/067
   USPC ................. 709/213, 217, 219, 223, 224, 231
   See application file for complete search history.

(56) References Cited

U.S. PATENT DOCUMENTS

| | | | |
|---|---|---|---|
| 2005/0102300 A1 | 5/2005 | Madsen | |
| 2007/0168431 A1* | 7/2007 | Lyle | G06Q 10/107 709/206 |
| 2010/0296432 A1* | 11/2010 | Mehta | H04B 7/15592 370/315 |
| 2012/0182860 A1* | 7/2012 | Liu | H04L 12/1863 370/216 |
| 2014/0317222 A1* | 10/2014 | Li | H04L 67/1097 709/213 |
| 2014/0317226 A1* | 10/2014 | Resch | G06F 11/1076 709/216 |

* cited by examiner

SERVER, DATA CACHING METHOD, AND COMMUNICATION SYSTEM

CLAIM OF PRIORITY

The present application claims priority from Chinese patent application No. 201310101545.7 filed on Mar. 28, 2013, the content of which is hereby incorporated by reference into this application.

BACKGROUND OF THE INVENTION

This invention relates to a server, a data caching method, and a communication system, and more particularly, to a server, a data caching method, and a communication system, for sending encoded data to a plurality of transmission nodes in case where a user terminal is a mobile terminal.

Hitherto, in a wireless network, each base station caches a plurality of files. When a user terminal requests one file, if the file has been cached by a base station (also referred to as local base station) belonging to a scope in which the user terminal is located, the local base station directly provides a service to the user terminal. On the other hand, if the file has not been cached by the local base station, the local base station acquires the file data from a network and sends the acquired file data to the user terminal (refer to US 2005/0102300 A1). In US 2005/0102300 A1, the base station is required to cache the entire content of the file, causing the consumption of the storage area of the base station.

Moreover, in EP 2202888 A1, there is disclosed "Raptor code", which is a typical implementation of fountain codes, which generate approximate infinite encoded packets from limited original packets, achieving a low encoding and decoding complexity. However, EP 2202888 A1 only proposes the application of fountain codes in data transmission in order to improve the efficiency and reliability of the data transmission, and an improvement of the storage efficiency by utilizing the fountain code to encode and store the data is not taken into consideration.

Further, in WO 2006/121900 A2, there are disclosed a multiple source wireless communication system and method. In the multiple source wireless communication system and method, in a cellular network, when a user terminal can receive communications from a plurality of base stations, Reed-Solomon coding (RS coding) or rateless encoding such as Tornado encoding or Raptor encoding is employed to encode a source data block including M packets, N packets of different subsets are sent from each of the base stations, the packets are received from the plurality of base stations at the receiver, and the source data block can be derived based on K (K=M+A) out of the N packets, where A<M, M<N.

In WO 2006/121900 A2, the wireless transmission terminals considered in the network are only confined to base stations. In the future, however, there are relay stations, small cells, and micro cells, etc. besides base stations in one cellar system. In addition, there is a macro cell containing a plurality of cells. Therefore, a problem of how to utilize different types of transmission terminals (including a case of overlapping coverage) to provide mobile reception for the user terminal has not been considered.

In addition, in WO 2006/121900 A2, applying the gain produced by mobile download of the user terminal to the optimization of data caching in the plurality of transmission sources is not taken into consideration. In fact, the mobility of the user terminal makes the same user terminal be able to receive the data from the plurality of base stations, and, for one base station, the user terminal can download the data from the one base station only in the period from moving into the coverage area of the one base station to moving out of the coverage area of the one base station.

When the cached data in a base station is more than the data that can be downloaded by the user terminal in the period, part of the data cannot be downloaded, which wastes the storage area in vain and reduces the data cache efficiency.

On the other hand, when the cached data in a base station is fewer, when the user terminal passes through the coverage area of the base station, the data is downloaded only in part of the period and the rest of the time is spare, causing the waste of the time. Besides, if the user terminal moves out of the coverage area of the base station in the period of downloading the data from the server via the base station, the case in which the download cannot be continued occurs, and on the contrary, the download efficiency of the user terminal is reduced.

SUMMARY OF THE INVENTION

This invention has been made in view of the above-mentioned problems, and an object of this invention is to provide a server, a data caching method, and a communication system, for improving a cache efficiency of transmission nodes and a data download efficiency.

In order to realize the above-mentioned object, according to one embodiment of this invention, there is provided a server including: a storage module for storing original files and characteristics of the original files; an encoding module for encoding the original files stored in the storage module to generate encoded symbols; an information acquisition module for communicating with at least one transmission node and acquiring state information from the at least one transmission node; a control module for calculating a number of the encoded symbols to be sent to the at least one transmission node for caching based on the characteristics of the original files stored in the storage module and the state information of the at least one transmission node acquired by the information acquisition module; and a communication module for sending the encoded symbols to the at least one transmission node based on the number of the encoded symbols calculated by the control module.

Moreover, in the server according to one embodiment of this invention, the characteristics of the original files include a timeout time for downloading a file, and the state information includes a coverage area of a transmission node, an average stay time of a user terminal in a transmission node, a number of the user terminals in a transmission node, an amount of a traffic load of a transmission node, a handover frequency of a user terminal in the transmission nodes, and an average channel state between a user terminal and a transmission node.

Further, in the server according to one embodiment of this invention, when calculating the number of the encoded symbols to be sent to each of the at least one transmission node for caching, the number of the encoded symbols to be sent to the each of the at least one transmission node for caching has a positive correlation to each of the coverage area of the transmission node, the average stay time of the user terminal in the transmission node, the number of the user terminals in the transmission node, and the average channel state between the user terminal and the transmission node, and has a negative correlation to each of the amount of the traffic load of the transmission node and the handover frequency of the user terminal in the transmission nodes.

Further, according to one embodiment of this invention, there is provided a data caching method for sending cached data to at least one transmission node coupled to the server, the data caching method including steps of: encoding original files stored in the server to generate encoded symbols; communicating with the at least one transmission node and acquiring state information from the at least one transmission node; calculating a number of the encoded symbols to be sent to the at least one transmission node for caching based on characteristics of the original files stored in the server and the acquired state information of the at least one transmission node; and sending the encoded symbols to the at least one transmission node based on the calculated number of the encoded symbols.

Further, according to one embodiment of this invention, there is provided a communication system, including a server, at least one transmission node, and at least one user terminal, the server and the at least one transmission node being coupled by wired connection, the at least one transmission node and the at least one user terminal being coupled by wireless connection, the at least one transmission node being configured to receive and cache encoded symbols sent from the server, the at least one user terminal being configured to request the encoded symbols cached by the at least one transmission node from the at least one transmission node, the server including: a storage module for storing original files and characteristics of the original files; an encoding module for encoding the original files stored in the storage module to generate encoded symbols; an information acquisition module for communicating with the at least one transmission node and acquiring state information from the at least one transmission node; a control module for calculating a number of the encoded symbols to be sent to the at least one transmission node for caching based on the characteristics of the original files stored in the storage module and the state information of the at least one transmission node acquired by the information acquisition module; and a communication module for sending the encoded symbols to the at least one transmission node based on the number of the encoded symbols calculated by the control module.

In addition, in the communication system according to one embodiment of this invention, the at least one user terminal requests the encoded symbols cached in the at least one transmission node from the at least one transmission node while moving.

Moreover, in the communication system according to one embodiment of this invention, the characteristics of the original files include a timeout time for downloading a file, and the state information includes a coverage area of a transmission node, an average stay time of a user terminal in a transmission node, a number of the user terminals in a transmission node, an amount of a traffic load of a transmission node, a handover frequency of a user terminal in the transmission nodes, and an average channel state between a user terminal and a transmission node.

Further, in the communication system according to one embodiment of this invention, when calculating the number of the encoded symbols to be sent to each of the at least one transmission node for caching, the number of the encoded symbols to be sent to the each of the at least one transmission node for caching has a positive correlation to each of a coverage area of a transmission node, an average stay time of a user terminal in a transmission node, a number of the user terminals in a transmission node, and an average channel state between a user terminal and a transmission node, and has a negative correlation to each of an amount of a traffic load of a transmission node and a handover frequency of a user terminal in the transmission nodes.

Further, according to one embodiment of this invention, there is provided a communication method, which is to be applied to communications among a server, at least one transmission node, and at least one user terminal, the server and the at least one transmission node being coupled by wired connection, the at least one transmission node and the at least one user terminal being coupled by wireless connection, the at least one transmission node being configured to receive and cache encoded symbols sent from the server, the at least one user terminal being configured to request the encoded symbols cached by the at least one transmission node from the at least one transmission node, the communication method including steps of: encoding original files stored in the server to generate encoded symbols; communicating with the at least one transmission node and acquiring state information from the at least one transmission node; calculating the number of the encoded symbols to be sent to the at least one transmission node for caching based on characteristics of the original files stored in the server and the acquired state information of the at least one transmission node; and transmission the encoded symbols to the at least one transmission node based on the calculated number of the encoded symbols.

According to one embodiment of this invention, it is possible to improve the cache efficiency of wireless communication nodes several times by caching after encoding the file. According to one embodiment of this invention, it is further possible to effectively reduce the downlink energy consumption for the cellular system with more relay stations.

DETAILED DESCRIPTION OF THE PREFERRED EMBODIMENT

With reference to the accompanying drawings, an embodiment of this invention is described below.

Figure 1:
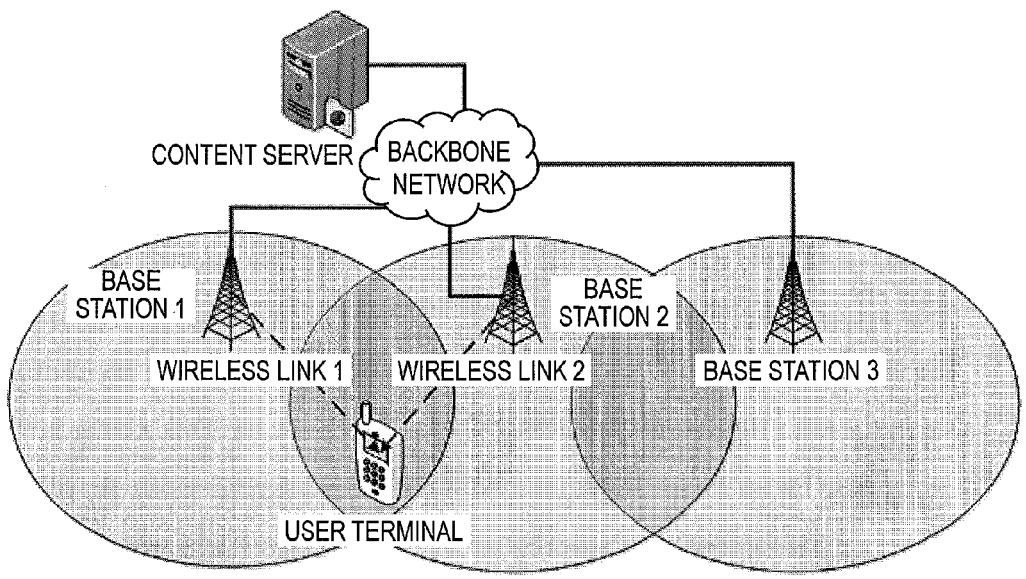
FIG. 1 is an explanatory diagram illustrating one example of a communication system of this invention.

FIG. 1 is an explanatory diagram illustrating a communication system of the embodiment of this invention. As illustrated in FIG. 1, the communication system of this invention mainly includes a server; base stations 1, 2 and 3; and a user terminal. The server is in wired connection to each of the base stations. Herein, the wired connection between the server and each of the base stations is referred to as "backbone network". Base stations 1, 2 and 3 are the intermediaries between the backbone network and a wireless network, and are connected to the user terminal by wireless transmission by the air. The user terminal is able to communicate with base stations 1 and 2 via wireless communication links 1 and 2, respectively.

The case in which the server is connected to three base stations is illustrated in FIG. 1. However, the server can be connected to an arbitrary number more than one of base stations.

Besides, although the base stations are illustrated as an example in FIG. 1, the base stations described in this invention can be any transmission nodes capable of caching the file data and communicating with the user terminal. The transmission nodes as used herein refer to various types of base stations or relay stations such as base stations, micro cell base stations, and small cell base stations. The transmission nodes may include only one type of the transmission node, or may include many types of transmission nodes at the same time.

Moreover, the user terminal has mobility, and by moving, the same user terminal may communicate with a plurality of base stations in the communication system. The user terminal of this embodiment can be a cellular phone, an EVDO or EVDV card in a mobile or desktop computer, or a combined communication and computing device such as a personal digital assistant (PDA) or a PDA combined with a cellular phone, and a commonly called smartphone. The case in which the user terminal can communicate with base stations 1 and 2 via the wireless communication links 1 and 2, respectively, is illustrated in FIG. 1. However, it should be understood that the user terminal can communicate with base station 3 when the user terminal moves into the coverage area of the base station 3.

Figure 2:
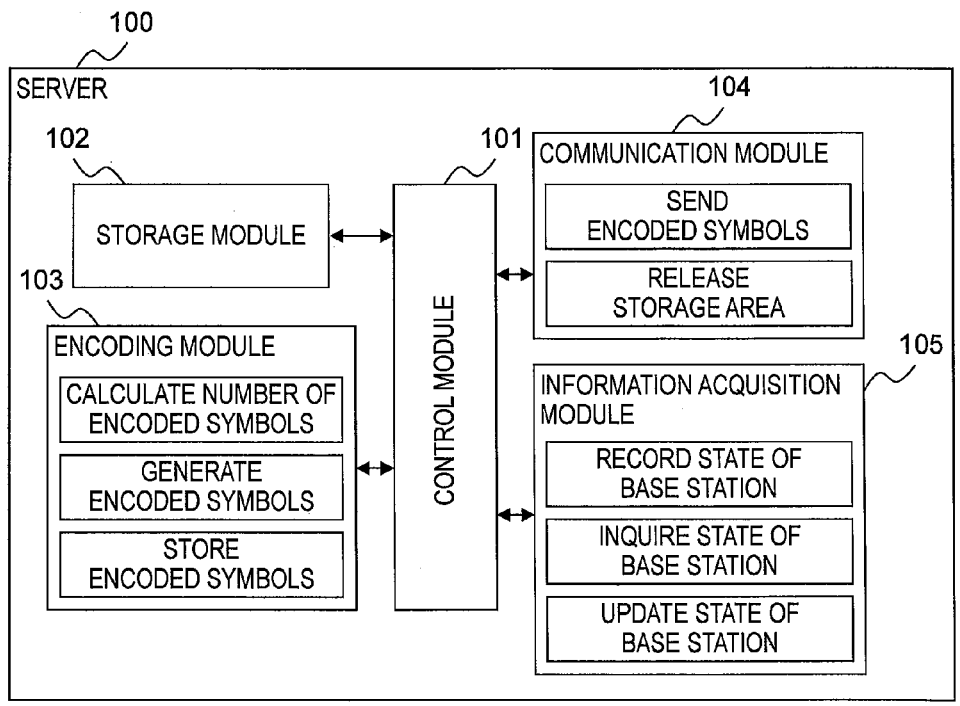
FIG. 2 is a block diagram illustrating the internal configuration of a server in the communication system of this invention.
Figure 3:
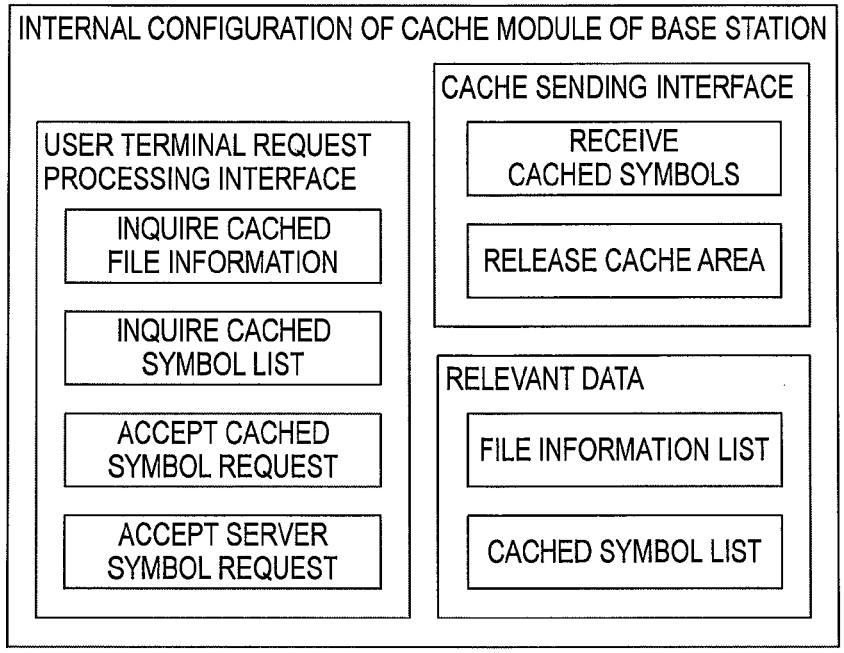
FIG. 3 is a block diagram illustrating the internal configuration of a cache module of a base station in the communication system of this invention.
Figure 4:
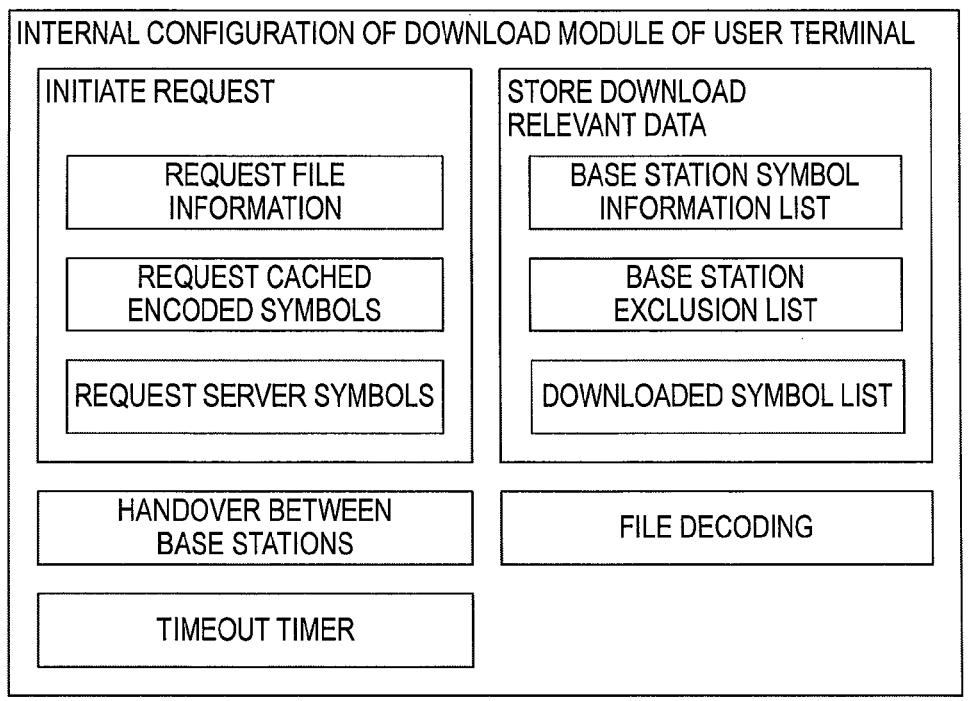
FIG. 4 is a block diagram illustrating the internal configuration of a download module of a user terminal device in the communication system of this invention.

With reference to FIGS. 2, 3 and 4, the detailed internal configurations of the server, the base station, and the user terminal are respectively described below.

FIG. 2 is a block diagram illustrating the internal configuration of the server of the embodiment of this invention.

The server stores original files, communicates with each of the transmission nodes under its jurisdiction, and coordinately controls the transmission nodes.

The server 100 of this invention mainly includes: a control module 101, a storage module 102, an encoding module 103, a communication module 104, and a base station information management module 105.

The control module 101, which is, for example, a central processing unit (CPU), is connected to the storage module 102, the encoding module 103, the communication module 104, and the base station information management module 105, and performs various types of processing including processing of controlling the action of each module in accordance with programs recorded in the storage module 102. For example, the control module 101 controls the data cache allocation process for each of the connected base stations.

The storage module 102 includes a hard disk or a dynamic random access memory (DRAM) etc., stores the programs and data that are required for the control module 101 to perform various types of processing, and also stores information such as the original files, the characteristics of the original files, encoded symbols generated by encoding the original files, a list of the connected base stations, and the state of each of the base stations.

The encoding module 103 encodes the original files stored in the storage module 102 to generate encoded symbols, and stores the generated encoded symbols into the storage module 102. Moreover, the encoding module 103 further calculates the number of encoded symbols. In this embodiment, Raptor code, which is a typical implementation of fountain codes, is adopted. However, an encoding method employing any other implementation of fountain codes may also be used.

The communication module 104 corresponds to a communication module for sending the encoded symbol of this invention, and includes: a stored symbol transmission module for sending the encoded symbols stored in the storage module 102 to each of the base stations connected to the server 100; and a storage area releasing module for releasing the storage area occupied by the encoded symbols that have been sent or the encoded symbols with low access frequency as needed.

The base station information management module 105 corresponds to an information acquisition module of this invention, and has a function of acquiring the state information of each of the base stations and a function of managing the base station information stored in the storage module 102, which includes recording, inquiring, and updating the states of the base stations etc. Here, the base station information management module 105 is an independent module. However, it should be understood that the base station information management module 105 may also be formed integrally with the control module 101 as a part of the control module 101.

FIG. 3 is a diagram illustrating the internal configuration of a cache module of the base station.

As illustrated in FIG. 3, the cache module of the base station of this invention mainly includes a user terminal request processing interface, a cache transmission interface (i.e. a cached encoded symbol transmission interface), and relevant data.

The user terminal request processing interface mainly performs the following functions of:

1) inquiring cached file information: when the user terminal requests the file information from the base station, the base station firstly inquires whether the file information is cached on a local base station. When no file information is cached, it is required to request the file information to the server and then return the file information to the user terminal.

2) inquiring a cached symbol list: when the user terminal requests the cached symbol list of the base station to the base station, the base station refers the cached symbol list and returns the initial sequence number and the number of the symbols of the cached symbol list to the user terminal.

3) accepting a cached symbol request: when the user terminal requests an encoded symbol cached by the base station from the base station, the base station reads the corresponding symbol from the cached symbol list and returns the corresponding symbol to the user terminal.

4) accepting a server symbol request: when the user terminal requests an encoded symbol of one file from the base station, if the symbol is not cached in the base station, the base station is required to request the symbol to the server and return the symbol to the user terminal.

The cache transmission interface mainly performs the following functions of:

1) receiving the cached symbols: when a new cacheable content occurs, the server sends the cacheable content to the base station for caching. The base station firstly determines whether there is enough area to store the content. When there is not enough area, the cache area is released by calling "releasing cache area" and then the sent symbols are written into the cached symbol list.

2) releasing cache area: the module is called when the base station has no enough cache area. The module requests the lowest access frequency of each file from the server, and discards the file with the lowest access frequency. This operation is performed continuously until the area is enough.

FIG. 4 is a diagram illustrating the internal configuration of a download module of the user terminal device.

As illustrated in FIG. 4, the download module of the user terminal device mainly performs the following functions of:

1) initiating a request to the base station, including requesting the file information, requesting the cached encoded symbols, and requesting the server encoded symbols. The requesting the file information means requesting the information such as the size S of the file, the number K of the original symbols, the number N of the encoded symbols, the size L of the encoded symbols, etc. from the base station (where S is less than and approximately equals to K*L). The requesting the cached encoded symbols means that the user terminal requests the encoded symbols of the file cached by the base station from the base station. The requesting the server encoded symbols means requesting the original symbols to the server (also referred to as "source station") via the base station when the timeout timer described later indicates timeout and there are no cached encoded symbols which can be requested.

2) storing the relevant data of download: the relevant data of download includes: the cache symbol list for storing the symbols cached respectively by different base stations; a base station exclusion list for storing base stations in which cached symbols have been totally received; and a downloaded symbol list for storing the encoded symbols which have been successfully downloaded.

3) handover between base stations: after the user terminal has downloaded all cached symbols of one base station, the base station is added to the base station exclusion list and the signal of another base station not listed in the base station exclusion list is retrieved, or another base station is retrieved and connected after downloading symbols are unsuccessfully downloaded due to being interrupted.

4) decoding the file: when the number of symbols which have been successfully downloaded is more than K, a decoding attempt is carried out once whenever one symbol is successfully downloaded. When the original file can be decoded, the download is continued then download becomes successful. When decoding is unsuccessful, the download is continued.

5) determining timeout: this function is performed by the timeout timer. The timeout time is dependent on the type of the content downloaded by the user terminal. For example: it is assumed that $T_{timeout}$ equals to 24 hours in a pre-download service of files and videos; it is assumed that $T_{timeout}$ equals to 4 hours in a download service of files; and it is assumed that $T_{timeout}$ equals to zero in a real play service of videos. The timer begins timing when the download starts, and when the download time exceeds the timeout time $T_{timeout}$, the timeout timer indicates timeout.

Figure 5:
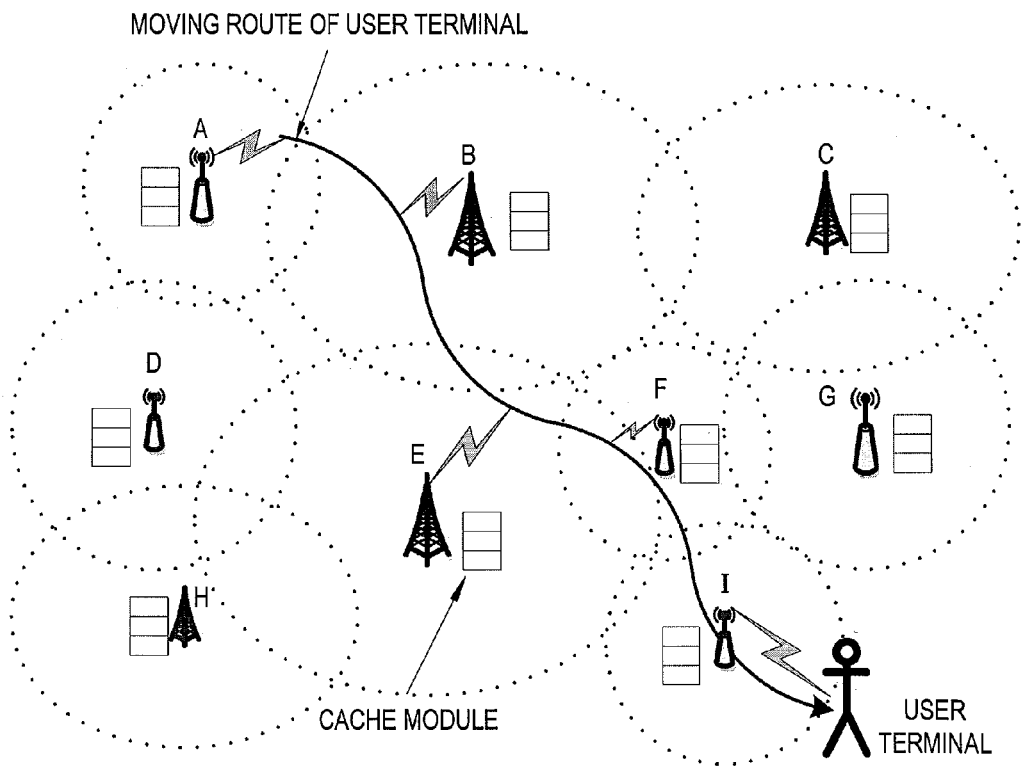
FIG. 5 is a schematic diagram illustrating how the user terminal takes a download action while moving.

FIG. 5 is a schematic diagram illustrating a download by the user terminal while moving. With reference to FIG. 5, the details of the download by the user terminal while moving are described below. In FIG. 5, nine transmission nodes A to I are illustrated, the dashed circles of FIG. 5 illustrate respective coverage areas $P_A$ to $P_I$ of nine transmission nodes. The user terminal moves from the transmission node A at the upper left corner to the transmission node I at the lower right corner, and the user terminal goes through the coverage areas $P_A$, $P_B$, $P_E$, $P_F$ and $P_I$ while moving. It is assumed that the stay times of the user terminal in the coverage areas $P_A$, $P_B$, $P_E$, $P_F$ and $P_I$ of the respective transmission nodes are respectively $T_A$, $T_B$, $T_E$, $T_F$ and $T_I$. The user terminal downloads the data from the corresponding transmission node during each stay time. When the user terminal is located in the coverage areas of the plurality of transmission nodes, the user terminal downloads the data from the connected base station, but the wellness of the communication condition with the base station, e.g., channel state (signal strength) is used to determine a specific one of the plurality of base stations to which the user terminal is to be connected. In normal cases, the user terminal communicates with the transmission node with low traffic load and good channel state, and when the channel state with one transmission node is poor, a handover to another connectable transmission node is carried out for communication. Various methods for determining and optimizing a specific one of the plurality of connectable transmission nodes communicating with the user terminal have been disclosed in known arts, and a description thereof is thus not repeated here. It should be understood that there is also a case in which the user terminal simultaneously communicates with the plurality of transmission nodes.

This invention improves the data caching method for each transmission node (hereafter sometimes also referred to as "base station") by utilizing the above-mentioned feature of the user terminal downloading the data from the transmission nodes while moving, so as to increase the data cache efficiency and the download efficiency of the user terminal.

As described above, the server 100 divides the original file stored in the storage module 102 into K original symbols with the same length through the encoding module 103. The original file is further encoded into N encoded symbols having the same length as the original symbols by the fountain code, where N>>K, and N encoded symbols are stored in the storage module 102. Each encoded symbol is marked by a unique sequence number. Because the Raptor code is a system code, that is to say, the first K encoded symbols are the original symbols. When the user terminal collects K+o (K) encoded symbols, the user terminal can decode the downloaded encoded symbols and acquire the original file, where o≥0.

For example, when it is assumed that one user terminal requests a file with a size of 8 MB, the file is divided into K (K=8,192) original symbols, in which the size of each symbol is L (L=1 kB), and further encoded into N (N=6,553,600) encoded symbols by Raptor code.

After encoding, the control module 101 of the server 100 sends N encoded symbols stored in the storage module 102 to the plurality of connected base stations for caching through the encoded symbol transmission interface (i.e., the communication module 104).

A method of sending N encoded symbols to the plurality of connected base stations for caching by the control module 101 is described below. It is assumed that there are i base stations, each of the base stations can cache an arbitrary number of encoded symbols, and the i-th base station caches $C_i$ encoded symbols.

In order to optimize the cache efficiency, the statistics of the mobile behavior of the user terminal and/or the states of the base stations are performed, and the numbers of encoded symbols cached by different transmission nodes are pertinently designed. Concretely, the number of the encoded symbols sent to each of the base stations is determined by the control module 101 based on a combination of the state of the base station in the network and the characteristics of the file.

The characteristics of the file mainly include a timeout time $T_{timeout}$ for downloading the file. The timeout time $T_{timeout}$ is dependent on the type of the content downloaded by the user terminal. The content providing server assigns this parameter while sending the content.

The state of the base station includes the coverage area of the base station, the average stay time of the user terminal in the base station, the number of the user terminals in the base station, the traffic load of the base station, the handover frequency (including the frequency of handover incoming and the frequency of handover outgoing) of the user terminal in the base station, and the average channel state of the user terminal in the base station. The average reference values of the stay time $T_{stay}$ of the user terminal in the macro base station and the average number $U_{macro}$ of the user terminals of the macro base station are counted by the operator, and are assigned in the cache module. The average number $U_{relay}$ of the user terminals in the relay stations and the average number $U_{micro}$ of the user terminals in the micro base stations are respectively counted by each base station and are acquired from the cache module of the corresponding micro base stations or relay stations.

On the design of the cache strategy, when other conditions of base stations are the same, the base station in which the average stay time of the user terminal is longer caches a larger number of encoded symbols, the base station with a larger number of user terminals caches a larger number of encoded symbols, the base station with higher traffic load caches a smaller number of encoded symbols, the base station with poor channel state caches a smaller number of encoded symbols, and the base station with frequent handover caches a smaller number of encoded symbols.

Several application modes in which the number of the encoded symbols sent to each base station is determined by the control module 101 based on a combination of the state of the base station in the network and the characteristics of the file are described below.

Application Mode 1

In Application Mode 1, the control module 101 allocates cached data to the plurality of transmission nodes in a homogeneous cellular network.

In the homogeneous cellular network, each of the transmission nodes in the cellular network has the same size and is located in the regular hexagonal cellular network.

In this case, each of the transmission nodes has the same coverage area, and thus has the same number of the sent encoded symbols. The encoded symbols to be sent to each of the transmission nodes for caching can be determined by the timeout time, the mobile coefficient (obtained in advance by statistics) of the user terminal, and the size of the file together. In the actual system, the average stay time $T_{stay}$ of the user terminal in one transmission node may be counted, and in this case, the number of the encoded symbols to be sent to each of the transmission nodes for caching is $K*T_{stay}/T_{timeout}$.

Application Mode 2

In Application Mode 2, the control module 101 allocates the cached data to the plurality of transmission nodes in a heterogeneous cellular network.

In the heterogeneous cellular network, each of the transmission nodes in the cellular network does not have exactly the same size, and hence the number of the encoded symbols to be sent to each of the transmission nodes for caching is required to be determined by taking into further consideration the parameters of the transmission node itself, i.e. the average number of the user terminals in the transmission node etc.

For example, the number of the encoded symbols to be sent to each of the transmission nodes for caching is proportional to the average number of the user terminals in the base station.

When it is assumed that the average number of the user terminals in the macro base station is $U_{macro}$ and the average number of the user terminals in one relay station is $U_{relay}$, the number of the encoded symbols to be allocated to the relay station is $K*T_{stay}/T_{timeout}*U_{relay}/U_{macro}$.

Application Mode 3

In a normal cellular network, some transmission nodes are under the condition of high load, while other transmission nodes are under the condition of low load.

Therefore, the number of the encoded symbols to be sent to each of the transmission nodes for caching is determined in view of the amount of the traffic load. For a low load transmission node, the transmission rate can be increased to send more encoded symbols in a shorter time. For a high load transmission nodes with limited transmission capacity, the number of encoded symbols for caching needs to be reduced.

For example, the number of the encoded symbols to be sent to each of the transmission nodes for caching has a negative correlation to the traffic load of each of the transmission nodes. The high load transmission nodes caches fewer encoded symbols, while the low load transmission nodes caches more encoded symbols.

Application Mode 4

Other conditions are the same in the cells (i.e., the coverage areas of the base stations). For some files related to the geographic locations, the probability of the user terminal requesting the file is directly related to the location of the user terminal. When it is assumed that the probability of the user terminal in each of the cells requesting the file is P1, P2, P3 . . . , respectively, the ratio of cached contents in the corresponding base stations is approximately P1: P2: P3 . . . .

These are just four special cases, and for specific design, the determination is required to be made by taking into comprehensive consideration the average stay time of the user terminal in the base station, the number of the user terminals in the base station, the traffic load of the base station, the handover frequency of the user terminal in the base stations, the average channel state of the user terminal in the base station, and the timeout time of downloading the file.

According to the embodiment of this invention, the file is cached after being encoded, which can improve the cache efficiency of wireless communication nodes several times. For the cell including more relay stations, this scheme can effectively reduce the downlink energy consumption.

Moreover, when the number of the symbols to be cached by each of the base stations is determined, by taking into consideration the factors such as the average stay time of the user terminal in the base station, the number of the user terminals in the base station, the traffic load of the base station, the handover frequency of the user terminal in the base stations, the average channel state of the user terminal in the base station, and the timeout time of downloading the file, the appropriate amount of cached data can be allocated to each of the base stations, the cache area in each of the base stations can be properly utilized, the cache efficiency can be improved, the utilization of the cached data in the base station can be improved, and the download efficiency of the user terminal can be improved.

Figure 6:
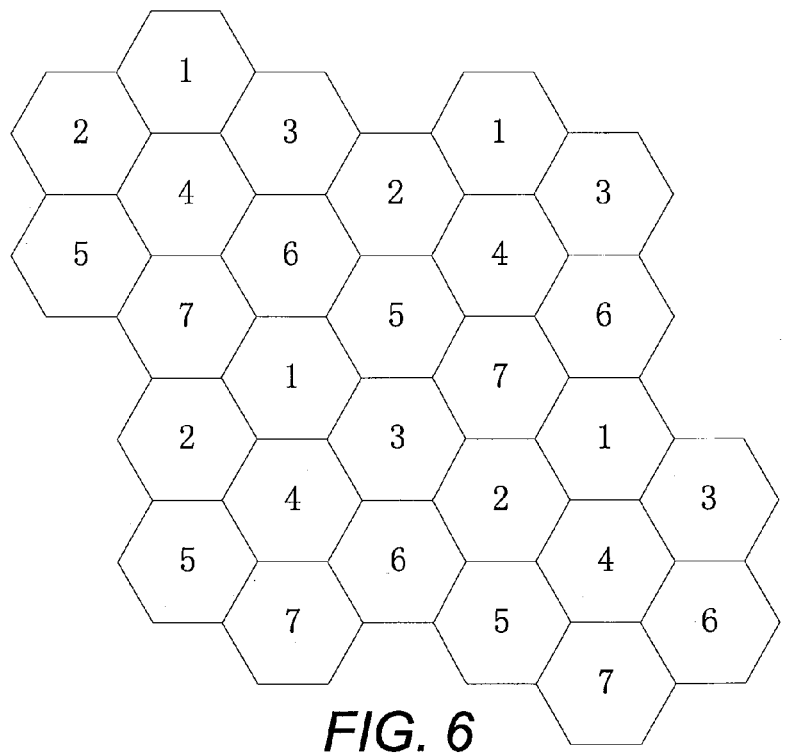
FIG. 6 is an explanatory diagram illustrating how the same encoded symbols are repeatedly reused among large-scale base stations.

In the embodiment of this invention, the types of the fountain codes used are not limited. As for the fountain codes, while some fountain codes are random encoding, which can generate an arbitrary number of symbols, the fountain code like Raptor code, which needs to ensure the decoding quality, has an upper limit of the number of encoded symbols but the value of the upper limit is huge. Therefore, in general, calculating and allocating the encoded symbols for caching in such a manner as described above in any one of Application Modes 1 to 4 causes no problem. However, in some extreme cases, when the number of the base stations is huge, even a state in which each base station caches one encoded symbol on average cannot be realized, and at this moment, such a mode as illustrated in FIG. 6, in which encoded symbols are reused among base stations, can be adopted. In FIG. 6, each hexagonal box represents a base station, the number labeled in each hexagonal box represents the encoded symbol cached by the base station itself, and the base stations labeled with the same number reuse the encoded symbol among those base stations. For example, in FIG. 6, four base stations labeled with the number "1" reuse the encoded symbol among those four base stations.

The communication system of this invention is described below. The communication system of this invention is realized mainly in two processes: a process in which the server sends the encoded symbols to the base station and then the base station caches the encoded symbols; and a process in which the user terminal downloads the symbols.

Figure 7:
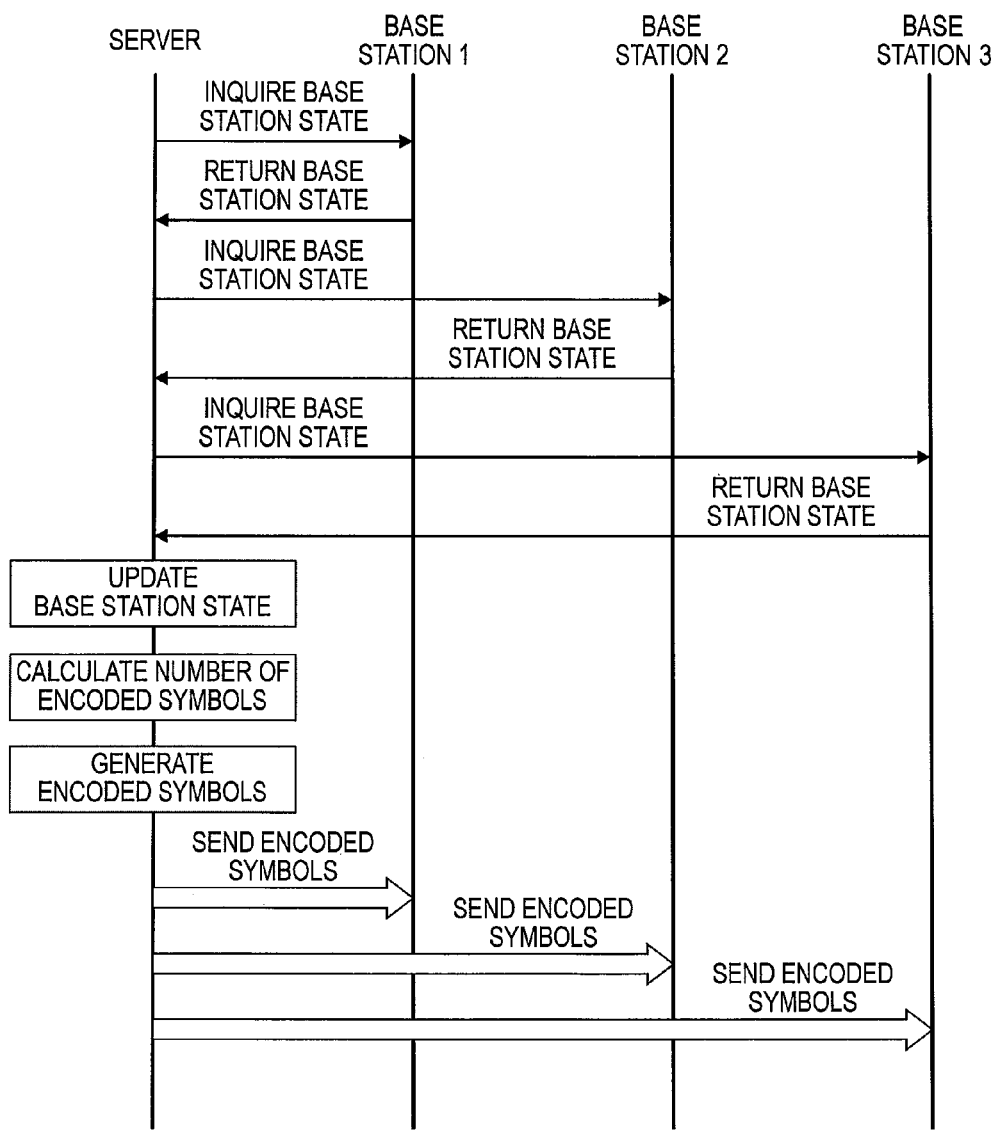
FIG. 7 is a sequence diagram of a transmission of the encoded symbols in the communication system according to the embodiment of this invention.

Firstly, with reference to FIG. 7, a signaling exchange process in which the communication system of the embodiment of this invention as illustrated in FIG. 1 sends the encoded symbols to the base stations is described.

As illustrated in FIG. 7, firstly, the server sends a request of inquiring the state of the base station to each of base stations 1, 2 and 3 via the backbone network.

Next, each of base stations 1, 2 and 3 returns the state of the base station itself to the server after receiving the request of inquiring the state of the base station sent from the server.

Next, after the server receives the state information of the base station from each of base stations 1, 2 and 3, the base station information management module 105 of the server employs the state information of the base station received to update the state of the base station.

Next, the server calculates the number of the encoded symbols based on the updated state of the base station. Calculating the number of the encoded symbols here is performed in such a manner as described above in any one of Application Modes 1 to 4. Specifically, the appropriate numbers of symbols to be cached by each of base stations 1, 2 and 3 are calculated based on the state information of each of base stations 1, 2 and 3.

Then, the server generates encoded symbols.

Next, the server sends the corresponding number of the encoded symbols to each of base stations 1, 2 and 3 based on the calculated number of the encoded symbols to be cached by each of the base stations.

Base stations 1, 2 and 3 cache the encoded symbols in their caches respectively after receiving the encoded symbols sent from the server, and each of base stations 1, 2 and 3 generate a file information list and a cached symbol list based on the encoded symbols received.

With this, the first main process of the communication system of the embodiment of this invention ends. The other main process of the communication system of this invention, i.e. the download process of the user terminal, is described below.

The download process of the user terminal is summarized as follows.

1) Starting the Download

When the user terminal initiates a download request, the user terminal initiates a query request to the closest base station, and the base station reports back the serial numbers (need to be defined) of the content cached in the base station. The user terminal records the serial numbers of received symbols on local, and hence the user terminal determines whether there are the serial numbers to be downloaded in the base station based on the serial numbers of symbols recorded on local and the serial numbers of cached content in the base station reported back by the base station, and further accordingly determines whether the base station is to be connected or be regarded as an excluded base station. When it is determined that there are serial numbers to be downloaded in the base station, the user terminal starts the request for each symbol to the base station one by one.

2) Handover

When the cached content of the currently connected base station is completely downloaded, or when the user terminal moves out of the service area of the original base station, the user terminal needs a handover. Similar to the current handover process, the user terminal notifies the original connected base station that the user terminal aborts the download, and starts the request to a new base station. As in the case of starting the download, the base station reports back the serial numbers of the content cached in the base station, and each of the user terminals initiates the download requests for the corresponding data.

3) Pausing the Download

If the content which is not downloaded by the user terminal cannot be found in the neighboring base stations that can be connected and the time does not exceed the timeout time $T_{timeout}$, the download is paused until a new base station that can be connected is found.

4) Finishing the Download

The user terminal starts an attempt at decoding after having collected K encoding packets, and when the attempt is successful, decoding is made in order to finish the download without sending a new symbol request. On the other hand, when the attempt is not successful, a new attempt of decoding is taken again after the download of the next symbol is finished.

5) Timeout Handling

A timeout time $T_{timeout}$ is set based on the extent of the delay tolerance of the downloaded content. When the download is still not finished over the timeout time, the download is not paused, and when the content which is not downloaded by the user terminal cannot be found in the neighboring base stations that can be connected, an original symbol request for completing the content is sent to the content source on the Internet directly via the backbone network of the base station.

Figure 8:
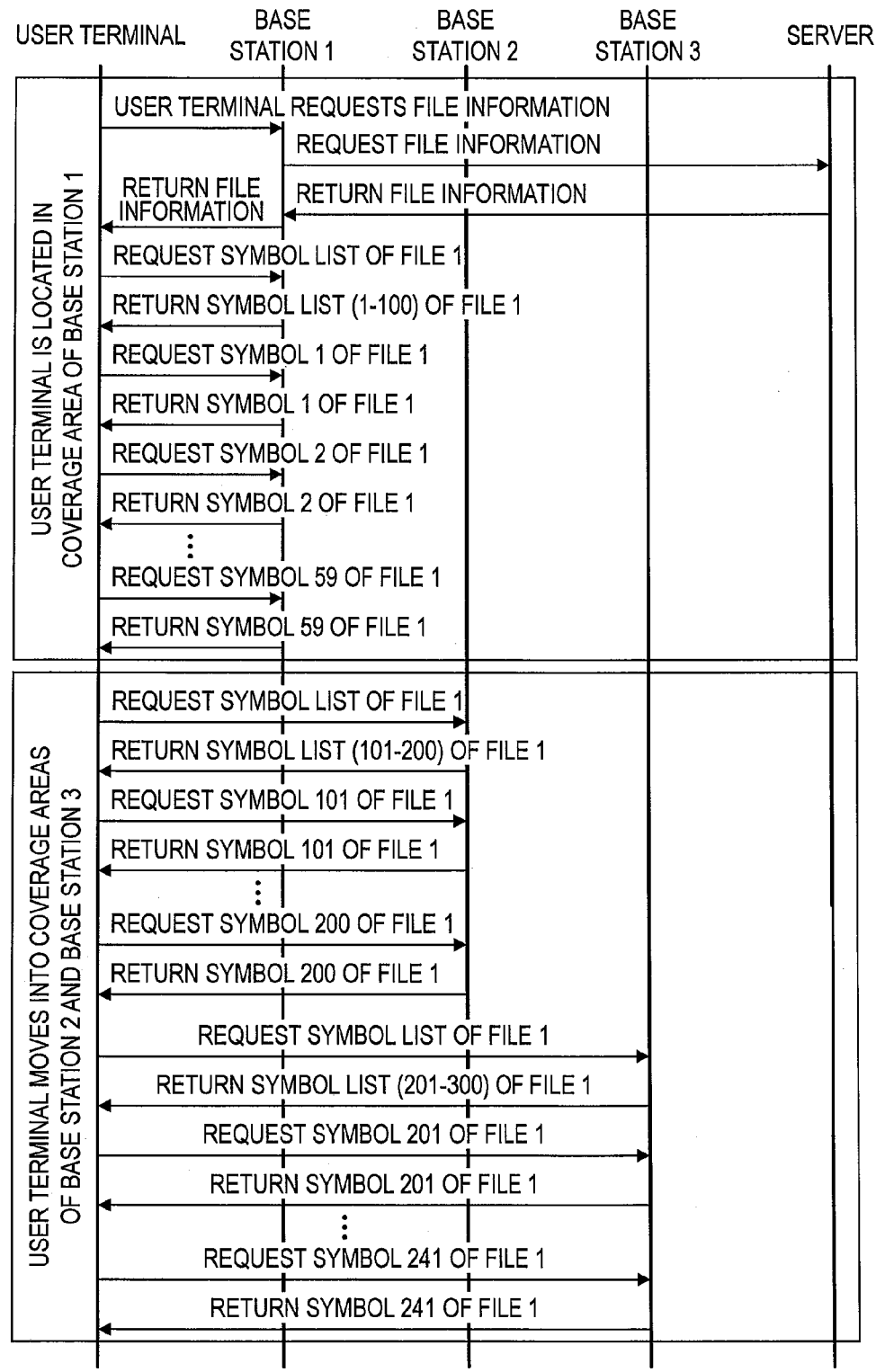
FIG. 8 is a signaling interaction diagram of one example in which the user terminal device in the communication system of this invention executes a download once without timeout.
Figure 9:
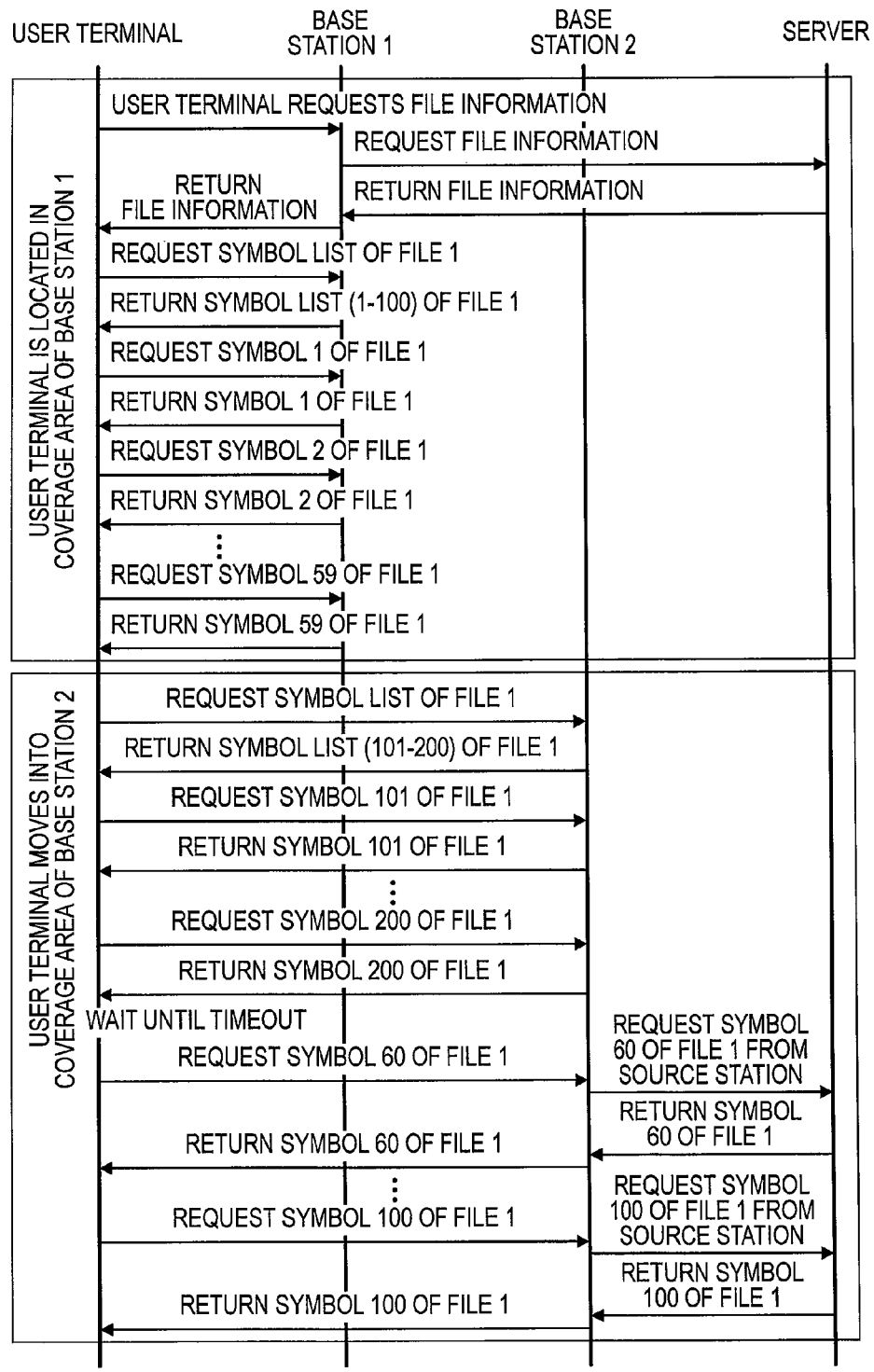
FIG. 9 is a signaling interaction diagram of one example in which the user terminal device in the communication system of this invention executes a timeout download once.

With reference to FIG. 8 and FIG. 9, the download process of the user terminal is described below in detail.

FIG. 8 is a sequence diagram of one example in which the user terminal device in the communication system of the embodiment of this invention executes a download once without timeout.

It is assumed that the number K of the original symbols equals to 300, and through the sending process as illustrated in FIG. 8, base station 1 caches the symbols 1 to 100, base station 2 caches the symbols 101 to 200, and base station 3 caches the symbols 201 to 300.

As illustrated in FIG. 8, initially the user terminal is located in the coverage area of base station 1 and always is in a moving state. The user terminal requests the relevant information of the file 1 (the size S of the file, the number K of the original symbols, the number N of the encoded symbols, and the size L of the encoded symbols) from base station 1. Base station 1 requests the file information from the server, and reports the file information back to the user terminal after receiving the file information from the server.

Next, the user terminal continues to request the cached symbol list in the base station from base station 1, and base station 1 returns the cached symbol list stored in base station 1 to the user terminal (symbols 1 to 100 in this example).

Next, the user terminal requests each symbol from base station 1.

After the 59th symbol is completely received, the user terminal moves out of the coverage area of base station 1 and moves into the coverage areas of base station 2 and base station 3. It is assumed here that the user terminal communicates with the base station with stronger signal (here assumed as base station 2). The user terminal requests the cached symbol list of base station 2 and requests the cached symbols of base station 2 one by one. After all cached symbols (101 to 200) of base station 2 are completely downloaded, the user terminal adds base station 2 into the base station exclusion list.

Next, the user terminal is still located in the coverage area of base station 3, and hence a handover to base station 3 for communication is made. Firstly, the cached symbol list of base station 3 is requested, and then the cached symbols of base station 3 are requested one by one.

After the cached symbol 241 of base station 3 is completely downloaded, the user terminal decodes the received symbols, generates the source file, stops the download, and completes the download.

FIG. 9 is a signaling interaction diagram of one example in which the user terminal device in the communication system of the embodiment of this invention executes a timeout download once.

As illustrated in FIG. 9, the download process is similar to the example of FIG. 8, but the difference is that the user terminal moves into the coverage area of base station 2 after leaving the coverage area of base station 1. After all cached symbols of base station 2 are completely downloaded by the user terminal, when all base stations are in the base station exclusion list, then the user terminal enters a wait state. When the timeout timer indicates timeout, the user terminal requests the original symbols from the server via base station 2 to finish the download.

Figure 10A:
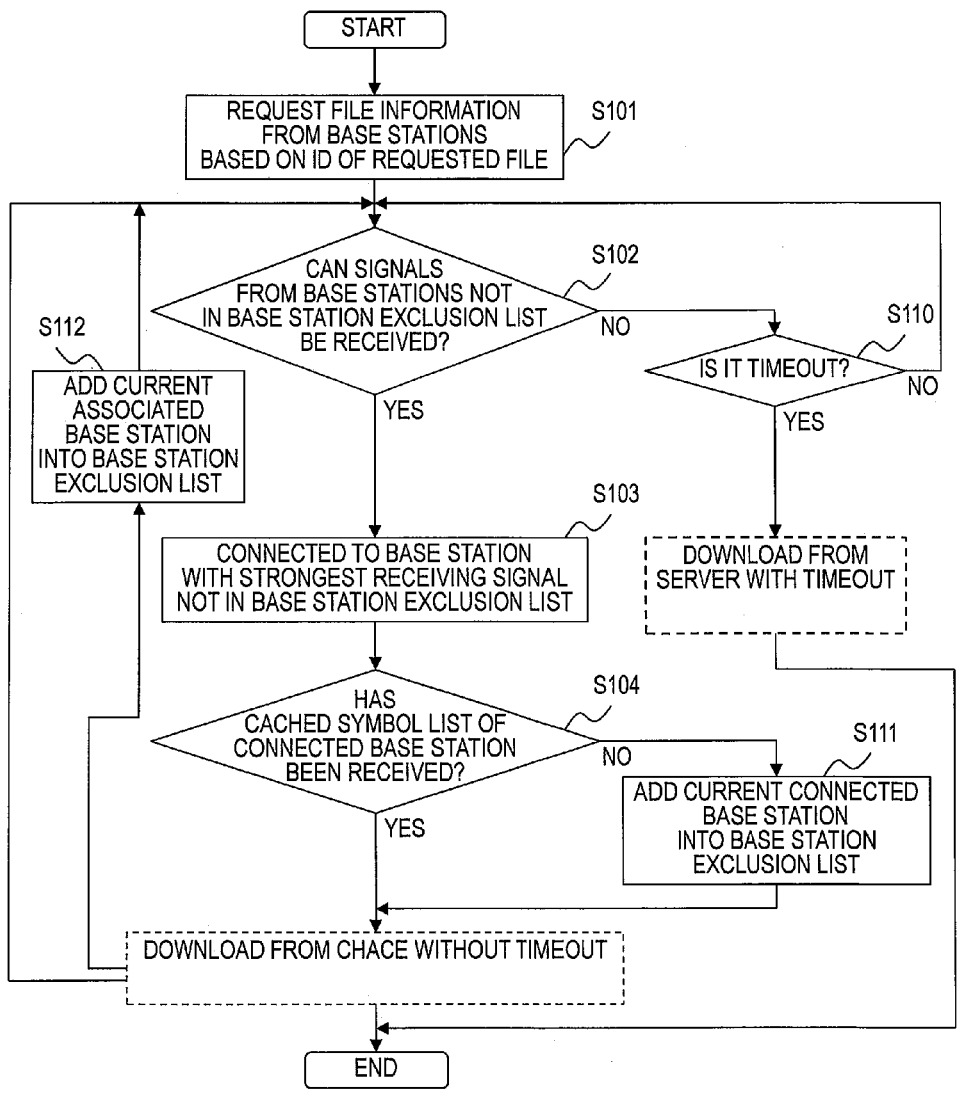
FIGS. 10A to 10C are flowcharts illustrating the download action of the user terminal device in the communication system of this invention.
Figure 10B:
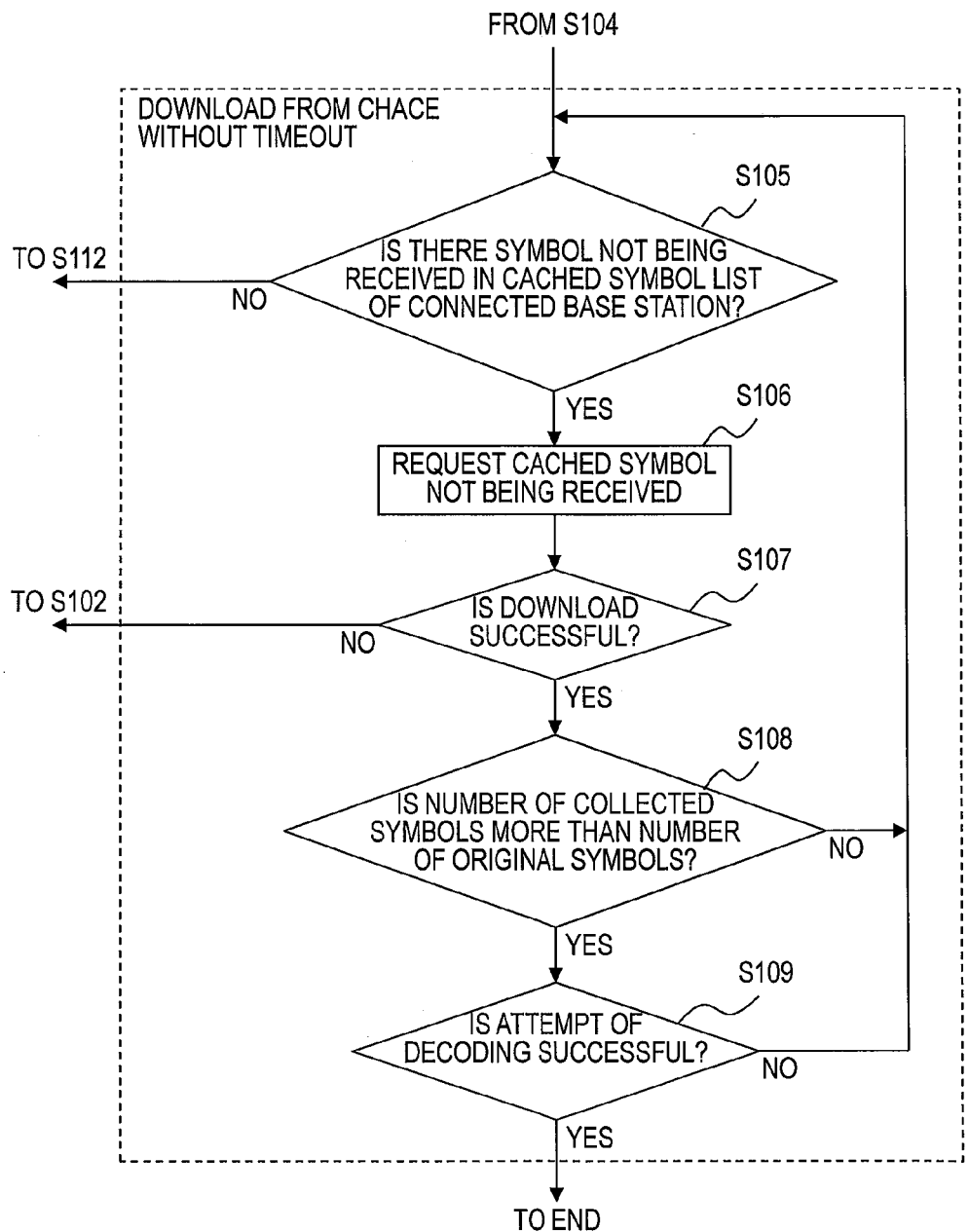
Figure 10C:
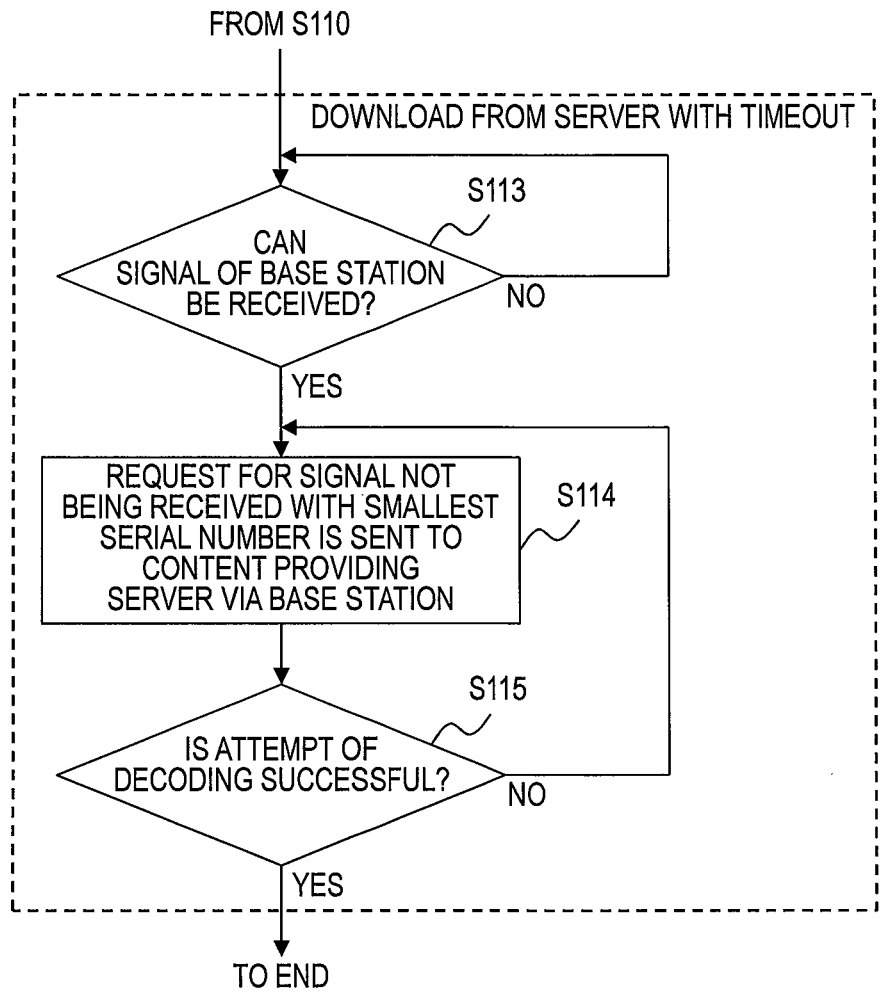

FIGS. 10A to 10C are flowcharts illustrating the download action of the user terminal device in the communication system of this invention.

As illustrated in FIG. 10A, firstly, the user terminal sends the file information requests to all base stations based on an ID of the requested file (Step S101).

Next, a determination is made as to whether the user terminal receives the signals from the base stations which are not in the excluded base station list (Step S102). When the determination is that the user terminal receives the signals from the base stations which are not in the base station exclusion list (being "Yes" in Step S102), the user terminal is connected to the base station with the strongest received signal of the base stations whose signals are received (Step S103). When the determination is that the user terminal does not receive the signals from the base stations which are not in the excluded base station list (being "No" in Step S102), the procedure goes to Step S110.

In Step S104, the user terminal determines whether the cached symbol list of the connected base station is received. When the determination is that the cached symbol list is received ("Yes" in Step S104), the user terminal further determines whether there is a symbol not being received in the cached symbol list of the connected base station (Step S105). When the determination is that the cached symbol list is not received ("No" in Step S104), the procedure goes to Step S111.

When the determination of Step S105 is that there exists a symbol not being received ("Yes" in Step S105), the procedure goes to Step S106. On the other hand, when the determination of Step S105 is that all symbols have been received ("No" in Step S105) does not exist, the procedure goes to Step S112 and the current connected base station is added into the base station exclusion list.

In Step S106, the user terminal requests one cached symbol not being received.

In Step S107, the user terminal determines whether the download is successful. When the determination is that the download is unsuccessful ("No" in Step S107), the procedure returns to Step S102. On the other hand, when the determination is that the download is successful ("Yes" in Step S107), the procedure goes to Step S108, in which a determination is made as to whether the number of the collected symbols is more than the number of the original symbols. When the determination is that the number of the collected symbols is not more than the number of the original symbols ("No" in Step S108), the procedure returns to Step S105. On the other hand, when the determination is that the number of the collected symbols is more than the number of the original symbols ("Yes" in Step S108), decoding is made and a determination is made as to whether decoding is successful (Step S109), and when the determination is that decoding is unsuccessful ("No" in Step S109), the procedure returns to Step S105. On the other hand, when the determination is that decoding is successful ("Yes" in Step S109), the process ends.

In addition, in Step S110, a determination is made as to whether it exceeds the timeout time. When the determination is that it exceeds the timeout time ("Yes" in Step S110), a determination is made as to whether the signal of the base station can be received (Step S113), and when the determination is that the signal of the base station cannot be received, Step S113 is repeated. On the other hand, when the determination is that the signal of the base station can be received ("Yes" in Step S113), a request for the symbol not being received with the smallest serial number is sent to the server via the base station (Step S114), decoding is made, and a determination is made as to whether decoding is successful (Step S115). When the determination is that decoding is unsuccessful (being "No" in Step S115), the procedure returns to Step S114. On the other hand, when the determination is that decoding is successful ("Yes" in Step S115), the process ends. When the determination is that it does not exceed the timeout time ("No" in Step S110), the procedure returns to Step S102.

In the above, the processes of caching and downloading the data of the communication system of this invention have been described.

According to the communication system of the embodiment of this invention, the file is cached after being encoded, which can improve the cache efficiency of the wireless communication nodes several times. For the cellular including more relay stations, this scheme can effectively reduce the downlink energy consumption.

Moreover, according to the communication system of the embodiment of this invention, the appropriate amount of the cached data can be allocated to each of the base stations, the cache area in each of the base stations can be properly utilized, the cache efficiency can be improved, and the utilization of the cached data in the base station can be improved.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

For example, the case in which there is only one user terminal in the communication system has been described, but it should be understood that there may be more than one user terminal in the communication system.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A server comprising:
a storage module for storing a plurality of original files and characteristics of each of the plurality of original files, each characteristic including a timeout time for downloading a respective original file, wherein each timeout time is based on a type of content of the respective original file;
an encoding module for dividing a first original file into a number of original symbols and for encoding the first original file to generate a number of a plurality of encoded symbols for the first original file;
an information acquisition module for communicating with a plurality of transmission nodes, which are each one of a base station and a relay station, and acquiring state information from each of the plurality of transmission nodes;
a control module for calculating, for each of the plurality of transmission nodes, the number of the plurality of the encoded symbols to be sent to each of the plurality of transmission nodes for caching based on a first timeout time of the first original file stored in the storage module and the state information of each of the plurality of transmission nodes acquired by the information acquisition module; and
a communication module for sending the plurality of the encoded symbols to each of the plurality of transmission nodes based on the number of the plurality of the encoded symbols calculated by the control module and for assigning the first timeout time to the first original file based on a type of content of the first original file, wherein the first timeout time is sent to the plurality of transmission nodes,
wherein the state information acquired for each of the transmission nodes includes a coverage area of a first transmission node, of the plurality of transmission nodes, an average stay time of a first user terminal of the first transmission node, a number of user terminals in communication with the first transmission node, an amount of a traffic load of the first transmission node, a frequency of users handed over to the first transmission node and a frequency of users handed off by the first transmission node, and an average channel state between the first user terminal and the first transmission node,
wherein the control module determines whether each of the plurality of transmission nodes has a same coverage area and if each of the plurality of transmission nodes have the same coverage area, then the control module determines the number of the plurality of the encoded symbols to be sent to each of the plurality of transmission nodes for caching based on the number of the original symbols for the first original file, the average stay time of the first terminal of the first transmission node, and the first timeout time of the first original file.

2. The server according to claim 1, wherein, when calculating the number of the plurality of encoded symbols to be sent to each of the plurality of transmission nodes for caching, the number of the encoded symbols to be sent to each of the plurality of transmission nodes for caching has a positive correlation to each of: the coverage area of the first transmission node, the average stay time of the first user terminal of the first transmission node, the number of the user terminals communicating with the first transmission node, and the average channel state between the first user terminal and the first transmission node, and has a negative correlation to each of the amount of the traffic load of the first transmission node and the frequency of users handed over to the first transmission node and the frequency of users handed off by the first transmission node.

3. A data caching method for sending cached data to a plurality of transmission nodes that are coupled to a server, the data caching method including steps of:
storing a plurality of original files and characteristics of each of the plurality of original files, each characteristic includes a timeout time for downloading a respective original file, wherein each timeout time is based on a type of content of the respective original file;
dividing a first original file into a number of original symbols and encoding the first original file to generate a number of a plurality of encoded symbols for the first original file;
communicating with the plurality of transmission nodes, which are each one of a base station and a relay station, and acquiring state information from the plurality of transmission nodes;

calculating, for each of the plurality of transmission nodes, the number of the plurality of encoded symbols to be sent to each of the plurality of transmission nodes for caching based on a first timeout time of the first original file stored in the server and the acquired state information of each of the transmission nodes;

assigning the first timeout time to the first original file based on the type of content of the first original file, wherein the first timeout time is sent to the plurality of transmission nodes, sending the plurality of encoded symbols to each of the plurality of transmission nodes based on the calculated number of the plurality of encoded symbols, wherein the state information acquired for each of the transmission nodes includes a coverage area of a first transmission node, of the plurality of transmission nodes, an average stay time of a first user terminal of the first transmission node, a number of user terminals in communication with the first transmission node, an amount of a traffic load of the first transmission node, a frequency of users handed over to the first transmission node and a frequency of users handed off by the first transmission node, and an average channel state between the first user terminal and the first transmission node, and wherein the control module determines whether each of the plurality of transmission nodes has a same coverage area and if each of the plurality of transmission nodes have the same coverage area, then the control module determines the number of the plurality of encoded symbols to be sent to each of the plurality of transmission nodes for caching based on the number of the original symbols for the first original file, the average stay time of the first user terminal of the first transmission node, and the first timeout time of the first original file.

4. A communication system comprising
a server,
a plurality of transmission nodes, which are each one of a base station and a relay station, and
a plurality of user terminals,
the server and the plurality of transmission nodes being coupled by wired connection,
the plurality of transmission nodes and the user terminals being coupled by wireless connection,
the plurality of transmission nodes being configured to receive and cache encoded symbols sent from the server,
each of the plurality of user terminals being configured to request the encoded symbols cached by a transmission node, of the plurality of transmission nodes, from the transmission node,
the server including:
a storage module for storing a plurality of original files and characteristics of each of the plurality of original files, each characteristic including a timeout time for downloading a respective original file, wherein each timeout time is based on a type of content of the respective original file;
an encoding module for dividing a first original file into a number of original symbols and for encoding the first original file to generate a number of a plurality of encoded symbols for the first original file;
an information acquisition module for communicating with a plurality of transmission nodes, and acquiring state information from each of the plurality of transmission nodes;

a control module for calculating, for each of the plurality of transmission nodes, the number of the plurality of the encoded symbols to be sent to each of the plurality of transmission nodes for caching based on a first timeout time of the first original file stored in the storage module and the state information of each of the plurality of transmission nodes acquired by the information acquisition module; and a communication module for sending the plurality of encoded symbols to each of the plurality of transmission nodes based on the number of the plurality of encoded symbols calculated by the control module and for assigning the first timeout time to the first original file based on a type of content of the first original file, wherein the first timeout time is sent to the plurality of transmission nodes, wherein the state information acquired for each of the transmission nodes includes a coverage area of a first transmission node, of the plurality of transmission nodes, an average stay time of a first user terminal of the first transmission node, a number of user terminals in communication with the first transmission node, an amount of a traffic load of the first transmission node, a frequency of users handed over to the first transmission node and a frequency of users handed off by the first transmission node, and an average channel state between the first user terminal and the first transmission node, wherein the control module determines whether each of the plurality of transmission nodes has a same coverage area and if each of the plurality of transmission nodes have the same coverage area, then the control module determines the number of the plurality of encoded symbols to be sent to each of the plurality of transmission nodes for caching based on the number of the original symbols for the first original file, an average stay time of the first user terminal of the first transmission node, and the first timeout time of the first original file.

5. The communication system according to claim 4, wherein the first user terminal requests the plurality of encoded symbols cached in the plurality of transmission nodes from the plurality of transmission nodes while moving.

6. The communication system according to claim 4, wherein, when calculating the number of the plurality of encoded symbols to be sent to each of the plurality of transmission nodes for caching, the number of the plurality of encoded symbols to be sent to the each of the plurality of transmission nodes for caching has a positive correlation to each of: the coverage area of the first transmission node, the average stay time of the first user terminal of the first transmission node, the number of user terminals in communication with the first transmission node, and the average channel state between the first user terminal and the first transmission node, and has a negative correlation to each of: the amount of a traffic load of the first transmission node and the frequency of users handed over to the first transmission node and the frequency of users handed off by the first transmission node.

7. The communication system of claim 4,
wherein each of the plurality of user terminals includes a timeout timer,
wherein when a time of the timeout timer of the first user terminal exceeds the first timeout time received by the first user terminal and if the first user terminal determines a signal cannot be received by the first user terminal from a predetermined set of transmission nodes, the first user terminal sends a request to download one or more original symbols from the server.

\* \* \* \* \*